(12) United States Patent
Lu et al.

(10) Patent No.: US 7,812,466 B2
(45) Date of Patent: Oct. 12, 2010

(54) ADJUSTABLE RESONANCE FREQUENCY VIBRATION POWER HARVESTER

(75) Inventors: Liang-Ju Lu, Eden Prairie, MN (US); Robert Hedtke, Young America, MN (US)

(73) Assignee: Rosemount Inc., Eden Prairie, MN (US)

( * ) Notice: Subject to any disclaimer, the term of this patent is extended or adjusted under 35 U.S.C. 154(b) by 485 days.

(21) Appl. No.: 12/012,900

(22) Filed: Feb. 6, 2008

(65) Prior Publication Data

US 2009/0195222 A1    Aug. 6, 2009

(51) Int. Cl.
*H01L 41/113* (2006.01)

(52) U.S. Cl. .................. 290/1 R; 310/339
(58) Field of Classification Search .................. 290/1 R
See application file for complete search history.

(56) References Cited

U.S. PATENT DOCUMENTS

| | | | |
|---|---|---|---|
| 3,064,096 A * | 11/1962 | Bosch .................. | 335/92 |
| 3,161,793 A | 12/1964 | Laithwait | |
| 3,581,129 A * | 5/1971 | Ganter et al. .................. | 310/25 |
| 3,786,413 A * | 1/1974 | Ross et al. .................. | 40/443 |
| 4,227,142 A | 10/1980 | Jarret et al. | |
| 4,318,016 A * | 3/1982 | McMullan et al. .................. | 310/19 |
| 4,387,318 A * | 6/1983 | Kolm et al. .................. | 310/330 |
| 4,470,121 A | 9/1984 | Ebert | |
| 4,500,827 A | 2/1985 | Merritt et al. | |
| 4,536,674 A * | 8/1985 | Schmidt .................. | 310/330 |
| 6,279,406 B1 | 8/2001 | Li et al. | |
| 6,407,484 B1 * | 6/2002 | Oliver et al. .................. | 310/339 |
| 6,835,463 B2 | 12/2004 | Srinivasan | |
| 6,858,970 B2 | 2/2005 | Malkin et al. | |
| 6,936,937 B2 | 8/2005 | Tu et al. | |
| 6,984,902 B1 | 1/2006 | Huang et al. | |
| 7,161,254 B1 | 1/2007 | Janky et al. | |
| 7,199,480 B2 | 4/2007 | Fripp et al. | |
| 7,208,845 B2 * | 4/2007 | Masters et al. .................. | 290/1 R |
| 7,224,077 B2 * | 5/2007 | Allen .................. | 290/1 R |

(Continued)

FOREIGN PATENT DOCUMENTS

WO    WO2006046989 A1    5/2006

(Continued)

OTHER PUBLICATIONS

Nayak, J. et al. "Design and Analysis of an Intensity Modulated Micro-opto-electro-mechanical Accelerometer Based on Nonuniform Cantilever Beam Proof Mass." J. Microlith., Microfab., Microsyst. 043012. Oct.-Dec. 2006/vol. 5(4).

(Continued)

*Primary Examiner*—Joseph Waks
(74) *Attorney, Agent, or Firm*—Kinney & Lange, P.A.

(57) ABSTRACT

A resonance frequency vibration power harvester includes an elongate body, a first vibration energy harvester device and a weight. The elongate body includes a first end, a second end and an interior channel extending through at least a portion of the elongate body between the first end and the second end. The second end of the elongate body is for connecting to a vibration source such that the first end is cantilevered. The first vibration energy harvester device is attached adjacent the first end of the elongate body, and the weight is joined to the interior channel to adjust a resonant frequency of the elongate body.

29 Claims, 5 Drawing Sheets

U.S. PATENT DOCUMENTS

| | | | |
|---|---|---|---|
| 7,256,505 B2* | 8/2007 | Arms et al. | 290/1 R |
| 7,541,720 B2* | 6/2009 | Clingman et al. | 310/339 |
| 2004/0012264 A1 | 1/2004 | Burger et al. | |
| 2004/0150529 A1 | 8/2004 | Benoit et al. | |
| 2005/0087019 A1 | 4/2005 | Face | |
| 2005/0230973 A1 | 10/2005 | Fripp et al. | |
| 2006/0244424 A1 | 11/2006 | Nelson | |
| 2007/0114890 A1* | 5/2007 | Churchill et al. | 310/339 |
| 2008/0136562 A1* | 6/2008 | Kulah et al. | 333/186 |
| 2010/0164711 A1* | 7/2010 | Arms et al. | 340/539.1 |

FOREIGN PATENT DOCUMENTS

| | | |
|---|---|---|
| WO | WO2007/070022 A2 | 6/2007 |
| WO | WO2008005113 A2 | 1/2008 |

OTHER PUBLICATIONS

Saha, C.R. et al. "Optimization of an Electromagnetic Energy Harvesting Device." IEEE Transactions on Magnetics. vol. 42, No. 10. Oct. 2006.

Meninger, S. et al. "Vibration-to-Electric Energy Conversion." IEEE Transactions on Very Large Scale Integration (VLSI) Systems. vol. 9, No. 1. Feb. 2001.

Murphy, J.F. "Transverse Vibration of a Simply Supported Beam with Symmetric Overhang of Arbitrary Length." Journal of Testing and Evaluation, JTEVA, vol. 25,. No. 5, Sep. 1997, pp. 522-524.

Whitney, S. "Vibrations of Cantilever Beams: Deflection, Frequency, and Research Uses." Website: <http://em-ntserver.unl.edu/Mechanics-Pages/Scott-Whitney/325hweb/Beams.htm> Accessed on: Apr. 27, 2007.

"Energy Harvesting and Scavenging Piezoelectric Volture." MIDE Technology Corporation. Website: <http://www.mide.com/prod_energy_harvester.html> Accessed on: Apr. 30, 2007. pp. 1-5.

"Vibration Energy Harvesting." PMG Perpetuum. Website: <http://www.perpetuum.co.uk/home.php?page_id=3> Accessed on: Apr. 30, 2007.

Murphy, J.F. "Transverse Vibration of a Simply Supported Beam with Symmetric Overhang of Arbitrary Length." Journal of Testing and Evaluation, JTEVA, vol. 25,. No. 5, pp. 522-524, Sep. 1997.

Whitney, S. "Vibrations of Cantilever Beams: Deflection, Frequency, and Research Uses." Website: <http://em-ntserver.unl.edu/Mechanics-Pages/Scott-Whitney/325hweb/Beams.htm> Apr. 23, 1999, 10 pages.

Omega Sensors, Inc., "Energy Harvesting with Omega Sensor's V-Power Technology", (date unknown) 1 page.

Amirtharajah, R., et al., "Self-Powered Signal Processing Using Vibration-Based Power Generation", IEEE Journal of Solid State Circuits, vol. 33, No. 5, May 1998. pp. 687-695.

Ching, N.N.H.,et al., "A laser-micro machined multi-modal resonating power transducer for wireless sensing systems", Sensors and Actuators, Elsevier, vol. A 97-98, 2002, pp. 685-690.

Choi, H.Y., et al., "Performance Evaluation of Permanent Magnet Linear Generator for Charging the Battery of Mobile Apparatus", Int. Conf. On Electr. Machines ICEM'2004, Brugges, Belgium, 2004.

Glynne-Jones, P., et al., "An electromagnetic, vibration-powered generator for intelligent sensor systems", Sensors and Actuators, Elsevier, vol. A110, 2004, pp. 344-349.

Lee, J.M.H., et al., "Vibration-to-Electrical Power Conversion Using High-Aspect-Ratio MEMS Resonators", Power MEMS Conf., Chiba, Japan, Dec. 2003 (15 pages).

Li, W.J., "Wireless Sensors with Integrated Vibration-induced Power Generator", Chinese University of Hong Kong, Integrated Sensors and Actuators for Robotics and Automation Applications IROS 2000 (39 pages).

Meninger, S., et al., "Vibration-to-Electric Energy Conversion", IEEE Trans. on VLSI Systems, vol. 9, No. 1, Feb. 2001, pp. 64-76.

Shearwood, C., et al., "Development of an Electromagnetic Microgenerator", Electronics Letters, Aug. 1997 pp. 883-884.

Shenck, N.S., et al., "Energy Scavenging with Shoe-Mounted Piezoelectrics", IEEE Micro, vol. 21, No. 3, May-Jun. 2001, from ,<www.computer.org/micro/homepage/may_june/shenck/shenck_print.html> (9 pages).

Sterken, T., et al., "Power Extraction from Ambient Vibration", Catholic University of Leuven, Leuven, Belgium, In Proc. of Workshop on Semiconductor Sensors, Nov. 2002 pp. 680-683.

Williams, C.B., et al., "Analysis of a Micro-Electric Generator for Microsystems", 8th Intern. Conf. on Solid-State Sensors and Actuators and Eurosensors IX, Stockholm, Sweden, 1995. pp. 369-372.

Bodson. M., et al., "Adaptive Algorithms for the Rejection of Sinusoidal Disturbances with Unknown Frequency", Automatica, vol. 33, No. 12, pp. 2213-2221, Dec. 1997.

Regalia, P.A., "An Improved Lattice-Based Adaptive", IIR Notch Filter, IEEE Trans. on Signal Proc., 39(9),. Sep. 1991, pp. 2124-2128.

* cited by examiner

ADJUSTABLE RESONANCE FREQUENCY VIBRATION POWER HARVESTER

BACKGROUND

This invention relates generally to vibration based power harvesters. More particularly, the present invention relates to an adjustable frequency vibration power harvester potentially for use in industrial process control and monitoring systems.

Process transmitters, or field devices, are used to monitor process parameters, such as pressure, temperature, flow and level of process fluids used in industrial processes. For example, process transmitters are typically employed in manufacturing and industrial facilities at multiple locations to monitor a variety of process parameters. Additionally, process transmitters are used in isolated field locations such as in cross-country pipelines. Process transmitters are typically integrated within a control system such that the process parameter or process fluid can be manipulated such as with a process control loop.

Process transmitters include sensors that produce an electrical output in response to physical changes in the process parameter. For example, capacitive pressure transducers or piezoresistive pressure transducers produce an electrical output as a function of the pressure of a process fluid. Each process transmitter also includes transmitter electronics for receiving and processing the electrical output of the sensor so that the transmitter and process parameter can be monitored locally or remotely. Locally monitored transmitters include displays, such as LCD screens, that show the electrical output at the site of the process transmitter. Remotely monitored transmitters include electronics that transmit the electrical output over a control loop or network to a central monitoring location such as a control room.

Wireless data transmission networks are rapidly becoming the preferred system for remotely monitored transmitters. Each transmitter, however, must be powered by a long-life battery, as power is not available from the control loop, and power outlets, such as 120 VAC utilities, are typically not located nearby or may not be allowed into hazardous areas where the transmitters are located without incurring great installation expense. In wireless mesh networks, each transmitter must be capable of routing messages for itself as well as other devices in the mesh network. The concept of messages hopping from node to node through the network is beneficial because lower power RF radios can be used, and yet the mesh network can span a significant physical area. Thus, power demands for wireless mesh networks are low and power can be generated from low power energy-scavenging devices. For example, vibration power harvesters that convert mechanical kinetic energy to electric potential energy have been used as power generating means for these control systems. The power produced by these power harvesters, however, is dependent on the available vibration source, which typically leads to a small and erratic power supply. Additionally, as the electronics for control systems and transmitters become more sophisticated, the power demand for these devices also increases. In order to increase the available power supply, it thus becomes necessary to stack several energy harvesting devices, which adds sometimes unjustifiable expense to the process monitoring and control system.

Thus, there is a need for a more efficient and less expensive energy harvesting device, particularly for use in industrial process control systems.

SUMMARY

The present invention is directed toward a resonance frequency vibration power harvester, which can be used in industrial process control systems. The resonance frequency vibration power harvester comprises an elongate body, a first vibration energy harvester device and a weight. The elongate body includes a first end, a second end and an interior channel extending through at least a portion of the elongate body between the first end and the second end. The second end of the elongate body is for connecting to a vibration source such that the first end is cantilevered. The first vibration energy harvester device is attached adjacent the first end of the elongate body. The weight is joined to the interior channel to adjust a resonant frequency of the elongate body.

DETAILED DESCRIPTION

Figure 1:
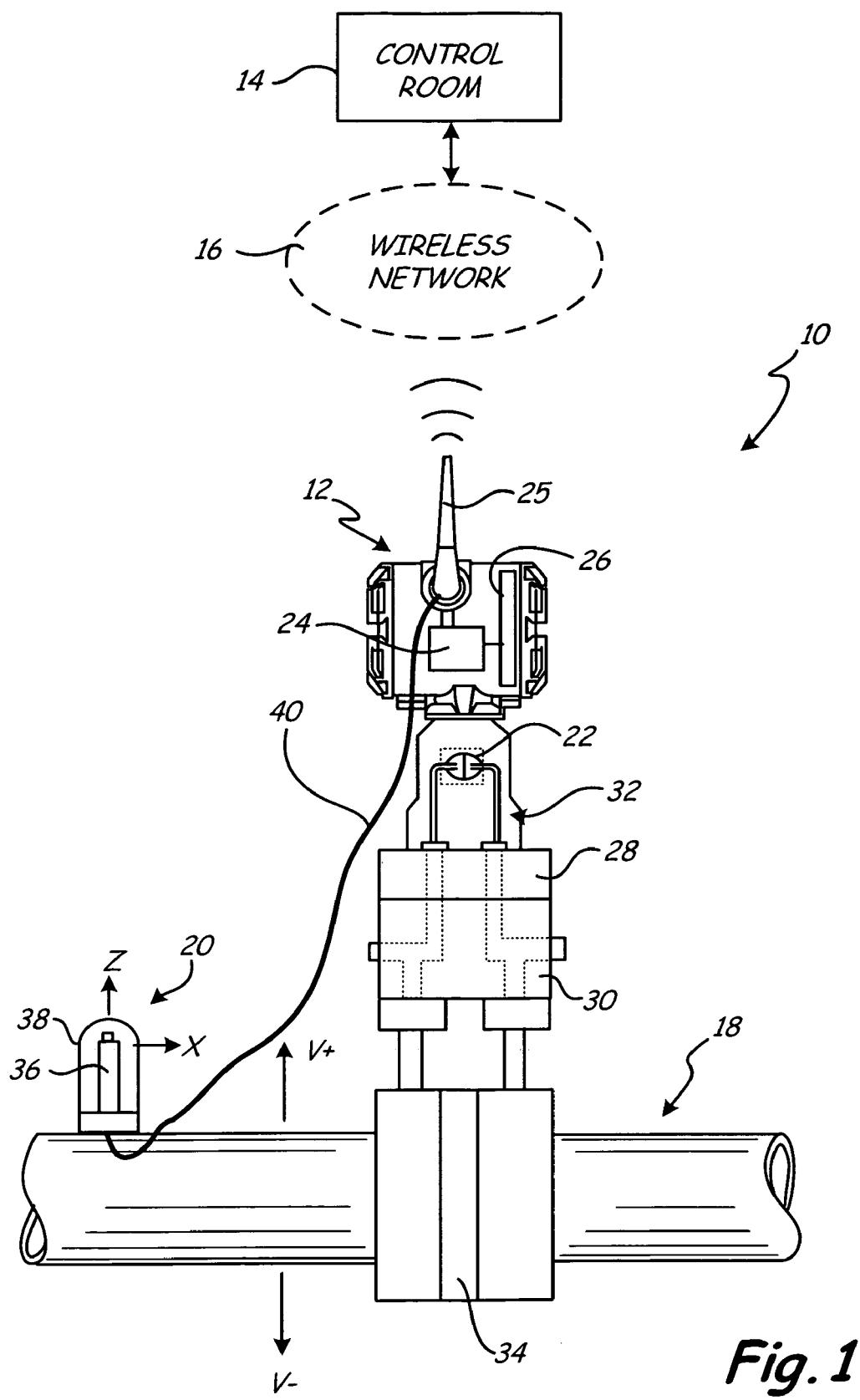
FIG. 1 shows an industrial process control system in which an adjustable frequency vibration power harvester of the present invention is used.

FIG. 1 shows process control or monitoring system 10, which includes pressure transmitter 12, control room 14, wireless network 16, process fluid conduit or pipeline 18, and adjustable resonance frequency vibration power harvester 20. Pressure transmitter 12 includes pressure sensor 22 for sensing the pressure level of a process fluid within pipeline 18, and transmitter circuitry 24 for transmitting electrical signals generated by pressure sensor 22 over wireless network 16 to control room 14 with antenna 25, or to local display 26, or both. Pressure transmitter 12 is connected to pipeline 18 with various connection devices, such as flange 28 and manifold 30, which enable a fluid connection between hydraulic system 32 of transmitter 12 and either side of orifice plate 34 of pipeline 18. As such, pressure sensor 22 is able to sense a pressure differential within the process fluid across orifice plate 34 to provide a measurement of flow. Control room 14 receives data from transmitter 12 and transmits data to transmitter 12. Transmitter circuitry 24 includes components for conditioning the output of sensor 22. Based on the processed pressure signal received from circuitry 24 and transmitter 12, control room 14 is able to adjust process parameters either through wireless network 16 or another control loop. For example, control room 14 can adjust the flow of the process fluid through pipeline 18 by adjusting appropriate valves. Transmitter circuitry 24 includes wireless communication components such as a transceiver, so that pressure transmitter 12 can operate over a wireless mesh network using an applicable mesh network protocol. Power for communicating over wireless network 16 and powering electronics 24 is delivered to transmitter 12 with adjustable resonance frequency vibration power harvester 20. Power harvester 20 comprises elongate body 36, cover 38 and power cable 40, which connects power harvester 20 to transmitter circuitry 24 within transmitter 12.

The process fluid flow within pipeline 18 or the connection of pipeline 18 to other vibrating equipment, such as motors or pumps, causes vibration of pipeline 18, as well as transmitter 12. Power harvester 20 is mounted to pipeline 18 and includes mechanical energy harvesting devices for converting vibration of pipeline 18 into electrical power. In other embodiments, power harvester 20 is mounted directly to process transmitter 12. Pipeline 18 is subjected to positive and negative vibratory forces V+ and V− (as well as other three dimensional forces) during operation of control system 10, which causes small, localized displacement of harvester 20 in the X any Y directions (as well as other directions) as pipeline 18 vibrates. The localized displacement of harvester 20 is oscillatory in nature such that harvester 20 vibrates at some frequency. Thus, the mechanical energy harvesting devices of harvester 20 undergo repeated, small displacements that are converted to mechanical energy. Harvester 20 also includes means for adjusting its mechanical features to induce it to resonance vibration. At resonance vibration, harvester 20 tends to vibrate at the frequency that induces the maximum localized displacement of the energy harvesting devices. Thus, the energy harvesting devices are more effectively able to reap electrical energy from the mechanical movement of pipeline 18.

Figure 2:
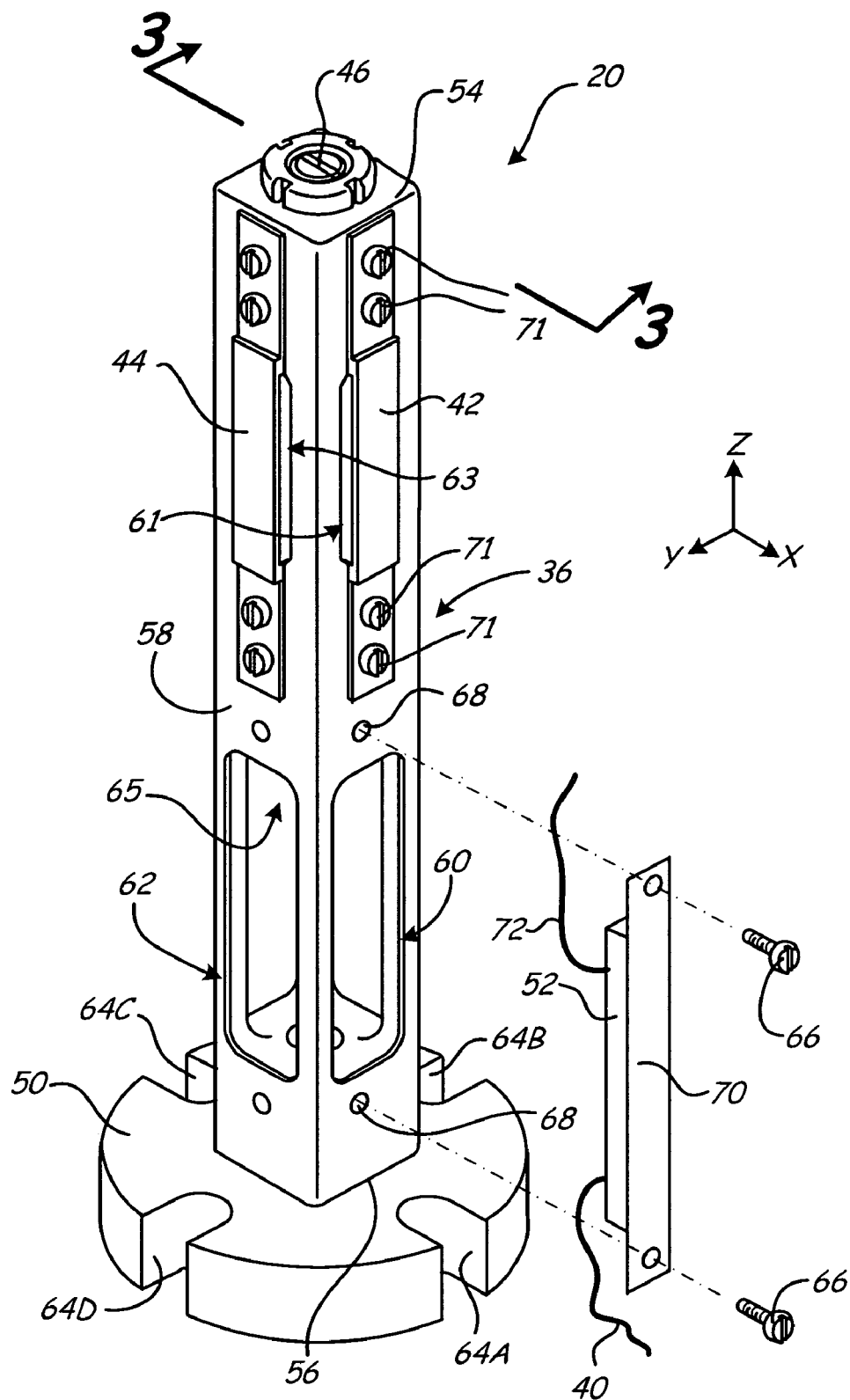
FIG. 2 shows a perspective view of a first embodiment of the adjustable frequency vibration power harvester of FIG. 1.

FIG. 2 shows a first embodiment of adjustable resonance frequency vibration power harvester 20 with cover 38 removed to reveal the components of power harvester 20. Power harvester 20 comprises elongate body 36, power harvester devices 42 and 44, weight 46, base 50 and circuitry 52. Elongate body 36 comprises first end 54, second end 56, midspan portion 58, harvester openings 61 and 63, and circuitry openings 60 and 62. Second end 56 of elongate body 36 is connected to base 50, which comprises a flange for connecting harvester 20 to pipeline 18, transmitter 12 or another vibration source. Base 50 preferably includes notches 64A-64D for receiving threaded fasteners or some other such means for mounting harvester 20. Base 50 can be made of any material rigid enough to efficiently transmit vibration from the vibration source to elongate body 36, such as metal, plastic, or composite. Base 50 is attached to elongate body 36 with a threaded fastener.

Elongate body 36 comprises a beam that generally extends perpendicularly from base 50 at second end 56 such that first end 54 is cantilevered. In the embodiment shown, elongate body 36 comprises a square beam, but in other embodiment, elongate body 36 may be circular, rectangular, or some other cross-sectional shape. First end 54, second end 56 and midspan portion 58 include a circular, interior passageway 65 so that weight 46 and other vibration altering features can be incorporated into elongate body 36. Each face of square elongate body 36 preferably includes two openings, such as openings 60 and 61 or openings 62 and 63, that intersect with passageway 65 of elongate body 36 to receive vibration harvester devices or any associated electronics. Openings 61 and 63 receive energy harvester devices 42 and 44, and opening 60 receives circuitry 52. Screw holes are provided at either end of each opening such that energy harvester devices or electronics can be mounted to elongate body 36. For example, screws 66 are inserted into holes 68 such that printed circuit board 70 upon which circuitry 52 are affixed can be mounted flush to elongate body 36 with circuitry 52 being inside elongate body 36. Likewise, harvester device 42 is mounted to elongate body 36 with screws 71. Harvester device 42 is mounted with a plurality of screws 71 at each end to ensure that harvester device 42 is immobilized with respect to elongate body 36 such harvester device 42 and first end 54 vibrate together.

Energy harvester device 42 is suspended over opening 61 and energy harvester device 44 is suspended over opening 63 such that they are free to flex into and out of elongate body 36 as harvester 20 vibrates when mounted to pipeline 18 (FIG. 1) or some other such vibration source. Energy harvesting devices 42 and 44 comprise devices that convert mechanical energy to electrical energy. In one embodiment, devices 42 and 44 comprise piezoelectric energy harvesting devices. Suitable piezoelectric energy harvesting devices are available commercially, such as from Mide Technology Corporation, Medford, Mass. In another embodiment, devices 42 and 44 comprise electromagnetic harvesting devices. Suitable electromagnetic energy harvesting devices are available commercially, such as from Perpetuum Limited, Southampton, England. Additionally, suitable vibration power energy devices are available from the present assignee of this application. Circuitry 52 includes power cable 40 for connecting circuitry 52 with transmitter 12 (FIG. 1) and input cable 72 for connecting circuitry 52 with energy harvesting device 42. Circuitry 52 and printed circuit board 70 include electronics for processing output of energy harvesting devices 42 and 44, such as rectifiers, capacitors, and DC or AC converters.

Energy harvester devices 42 and 44 are mounted to adjacent faces of elongate body 36 such that they are juxtaposed ninety degrees to each other. Thus, energy harvester device 42 can be configured for harvesting vibration energy of elongate body 36 in, for example, the X direction, while energy harvester device 44 can be configured for harvesting vibration energy of elongate body 36 in, for example, the Y direction. However, energy harvesting devices 42 and 44 can be configured to harvest energy in other directions, such as the Z direction, or in the same direction. In other embodiments, energy harvesting devices 42 and 44 are both configured to harvest energy in the same direction such that power harvesting in one direction can be increased. Output of energy harvesting devices 42 and 44 can be stacked before being converted to AC or DC current at circuitry 52. The means for adjusting the mechanical features of elongate body, such as weight 46, are adjusted to induce resonance frequency vibration of elongate body 36 in a desired direction to increase output of energy harvester devices 42 and 44.

Because elongate body 36 is cantilevered at base 50, movement of second end 56 from the vibration source is transmitted to first end 54. The movement, or deflection, of first end 54 is directly related to the frequency at which the vibration source vibrates and the natural frequency of elongate body 36. Movement of first end 54 is controlled by the length of elongate body 36, the resulting force applied to elongate body 36 during vibration, the elasticity of elongate body 36, and the mass of elongate body 36. These parameters can be altered or manipulated to change the natural frequency of elongate body 36 in order to induce resonance frequency vibration of elongate body 36. Power harvester 20 of the present invention, in its various embodiments presented in FIG. 2 through FIG. 5, includes features for adjusting the frequency of vibration of elongate body 36. FIG. 2 shows elongate body 36 having weight 46 attached to first end 54 at passageway 65 within elongate body 36. Additional internal features are included within interior passageway 65 to further adjust the vibration frequency of elongate body 36, which are better illustrated in the cross section of FIG. 3.

Figure 3:
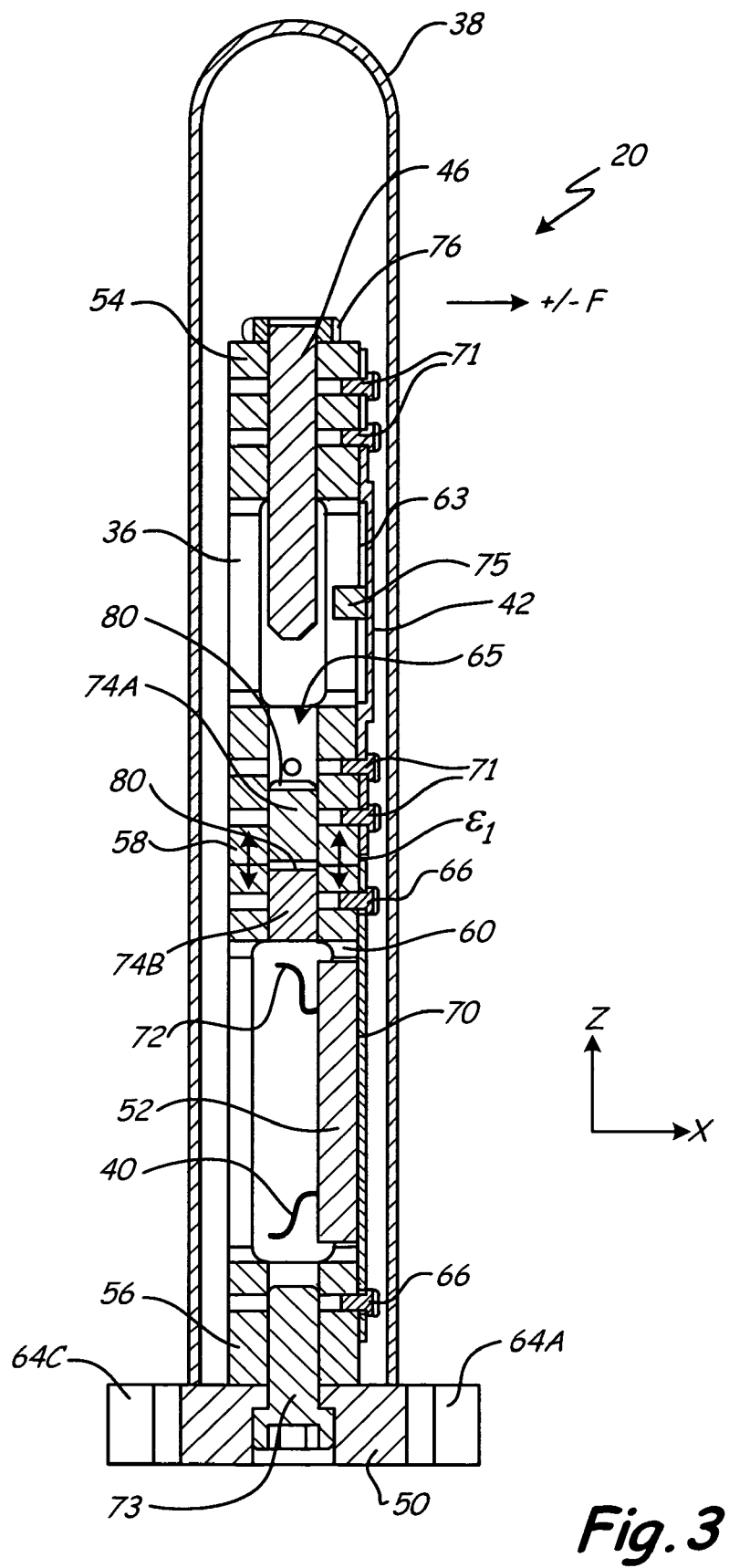
FIG. 3 shows a cross sectional view of the adjustable frequency vibration power harvester of FIG. 2.

FIG. 3 shows a cross sectional view of adjustable resonant frequency vibration power harvester 20 as taken at section 3-3 of FIG. 2. In this embodiment, power harvester 20 includes vibration energy power harvester device 42, weight 46, elongate body 36, base 50, circuitry 52, fastener 73, adjustment weights 74A and 74B and weight 75. Elongate body 36 includes first end 54, second end 56 and midspan portion 58. Second end 56 is connected to base 50 with fastener 73. Base 50 is mounted to a vibration source, such as pipeline 18 (FIG. 1), at notches 64A and 64C. Movement of the vibration source is transmitted through base 50 to second end 56, midspan portion 58 and first end 54. Accordingly, first end 54 undergoes an oscillatory displacement at the frequency of the vibration source. Weight 46 and adjustment weights 74A and 74B are adjusted to tune the natural frequency of elongate body 36 to match that of the frequency of the vibration source such that elongate body 36 vibrates at resonance.

First end 54 is situated at an end of passageway 65 and includes a threaded bore for receiving weight 46. Weight 46 is secured to first end 54 with, for example, threaded nut 76, which locks weight 46 into passageway 65. Weight 46 is placed at the distal end of elongate body 36 furthest away from base 50 and the vibration source to increase the displacement of first end 54 during vibration. As can be seen in equation (1) that follows, deflection d of a uniform, cantilevered beam is proportional to length l of the beam and force F applied to the free end of the beam, wherein E is the elastic modulus of the beam and I is the moment of inertia of the beam.

$$d = \frac{Fl^3}{3EI} \quad (1)$$

Thus, a greater deflection of first end 54 can be caused by increasing the force applied to the free end during vibration. The force applied to the free end, first end 54, is increased by increasing the momentum at first end 54. As is shown with Newton's second law, a force of an object in motion is equal to its mass times its acceleration.

$$F = m*a \quad (2)$$

Thus, the mass of weight 46 applies an oscillating force $+/-F$ at first end 54 proportional to the acceleration imparted to first end 54 by the vibration source, according to equation (2). The force of weight 46 causes a greater deflection of first side surface as is shown with equation (1), which affects the vibrational amplitude and frequency of first end 54. The mass and length of weight 46 can be selected to produce resonance vibration in elongate body 36 based on the induced vibration in elongate body 36 by the vibration source to maximize output of vibration power harvesters 42 and 44.

Additionally, the deflection of a cantilevered beam such as elongate body 36 is affected by the elastic modulus E of the beam, which is directly related to the stress $\sigma$ and strain $\epsilon$ in the beam. Equation (3) that follows illustrates the relationship between the elastic modulus E, force F, initial length $L_0$, initial cross-sectional area $A_0$ and change in length $\Delta L$ of a uniform body in tension.

$$E = \frac{\sigma}{\epsilon} = \frac{FL_0}{A_0 \Delta L} \quad (3)$$

As can be seen in the last part of equation (3), a smaller elastic modulus E, for a given force F, produces a larger change in length $\Delta L$ in the body, thus increasing strain $\epsilon$ within the body. With elasticity E and force F remaining constant, an increase in strain $\epsilon$ increases the change in length $\Delta L$. Similarly, strain is induced in elongate body 36 as force $+/-F$ puts elongate body in tension and compression during vibration. Thus, the deflection of first end 54 can be increased by increasing the strain within elongate body 36. The strain in elongate body 36 is adjusted by a) increasing the momentum-induced strain in elongate body 36 during vibration, such as with a weight, and b) mechanically altering the resting strain in elongate body 36. The first method a) is done with weight 46 as described above, while the second method b) is done with adjustable weights 74A and 74B.

Adjustable weights 74A and 74B comprise set screws that are threaded into passageway 65. In the embodiment shown, adjustable weights 74A and 74B comprise cylindrical plugs or disks. However, in other embodiments, adjustable weights 74A and 74B may comprise other shapes. Passageway 65 comprises a circular bore extending from first end 54 to second end 56. Near first end 54 and second end 56, and at midspan portion 58, elongate body 36 completely surrounds passageway 65. However, near openings 60-63 (See FIG. 2) elongate body 36 only bounds passageway 65 at its four corners, thus resulting in elongate body 36 having a non-uniform cross section. Passageway 65 is sized to accept weight 46, however, in other embodiments, the diameters of weight 46, weights 74A and 74B and passageway 65 are adjusted to meet specific design needs. Adjustable weights 74A and 74B include threads for engaging mating threads along passageway 65. Passageway 65 extends through elongate body 36 such that weight 46 is placed at first end 54 and adjustable weights 74A and 74B can be adjustably positioned along the length of elongate body 36. Adjustable weights 74A and 74B include sockets 80 for receiving a tool for rotating weights 74A and 74B within passageway 65. Weights 74A and 74B are adjusted within passageway 65 such that they abut each other and produce localized strain $\epsilon_1$ in the walls of elongate body 36 near where weight 74A and weight 74B meet. Weights 74A and 74B operate similar to that of jam nuts, wherein a first weight is threaded into a position within passageway 65 where the localized strain is desired to be produced, and then the second weight is threaded up against the first and torqued down. As the weights are pressed together, their threaded engagement with elongate body 36 puts the walls of elongate body 36 into tension. Thus, as described above with reference to equations (1) and (3), the displacement of first end 54 is affected during vibration. The position of the localized strain $\epsilon_1$ is selected to induce resonance vibration of elongate body 36 for the given vibration frequency of the vibration source. Similar to that of weight 46, the mass of weights 74A and 74B influence the vibration of elongate body 36. Thus, the material of weights 74A and 74B and weight 46 can be selected to produce the desired impact on the vibration of elongate body 36. The mass and positions of weights 46, 74A and 74B are adjusted to bring elongate body 36 into resonance frequency to increase the displacement of first end 54 and harvester device 42. As such, the energy harvested by device 42 is maximized for the given frequency generated by the vibration source.

The local displacement of harvester device 42 within opening 63 can also be increased to further increase the energy available for harvesting. Weight 75 is placed along the midspan portion of harvester device 42 to increase the localized deflection of device 42. Just as weight 46 increases the deflection of elongate body 36 due to the imparted forces of the vibration source, weight 75 uses the acceleration generated by the vibration source to increase deflection of harvester device 42. Also, the size and mass of weight 75 is selected to produce resonance vibration of harvester device 42 based on the frequency input of the vibration source. Accordingly, the output of harvester device 42 is increased by increasing the absolute and relative displacement of device 42 with weights 46 and 75, and weights 74A and 74B.

The local strain $\epsilon_1$ induced by first weight 74A and second weight 74B produce a discontinuity in elongate body 36, producing a two-stage beam with segments having different natural frequencies of vibration. Additionally, elongate body 36 is non-uniform in that the weights 46, 74A and 74B and openings 60-63 produce, for example, mass discontinuities along elongate body 36. The deflection of a cantilevered beam depends on the mass of the beam, the length of the beam and the elasticity of the beam as is shown in equations (1), (2) and (3). Equations (1), (2) and (3) are, however, directed to beams having uniform properties. Beams having non-uniform properties, such as non-uniform mass or elasticity across the length of the beam, or a discontinuity in the length of the beam, adds further complexity to equations (1), (2) and (3), but are still affected by the length, mass and elasticity of the beam. The length, weight mass and non-uniformity of a beam determine the natural frequency of the beam. The natural frequency $f_n$ of a beam having a first segment having length $L_1$ and a second segment having length $L_2$ is affected by the elastic modulus E of the beam, the mass m of the beam, and the moment of inertia of the first segment $I_1$, as shown in equation (4).

$$f_n = \frac{1}{2\pi}\sqrt{\frac{3EI_1}{m\left(L_1+\frac{L_2}{2}\right)^3}} \quad (4)$$

Thus, equations (1) through (4) show that the natural frequency of a non-uniform beam can be altered by (a) changing the mass of the beam such as by adding weight 46 or by (b) changing the elastic modulus E of the beam such as by altering the strain $\epsilon_1$ in elongate body 36 with weights 74A and 74B. Equations (1) through (4) also show that the natural frequency of a non-uniform beam can be altered by (c) changing the length of at least one segment of the non-uniform beam, or by (d) changing the distribution of the mass along the length of the beam, which are illustrated in FIGS. 4 and 5.

Figure 4:
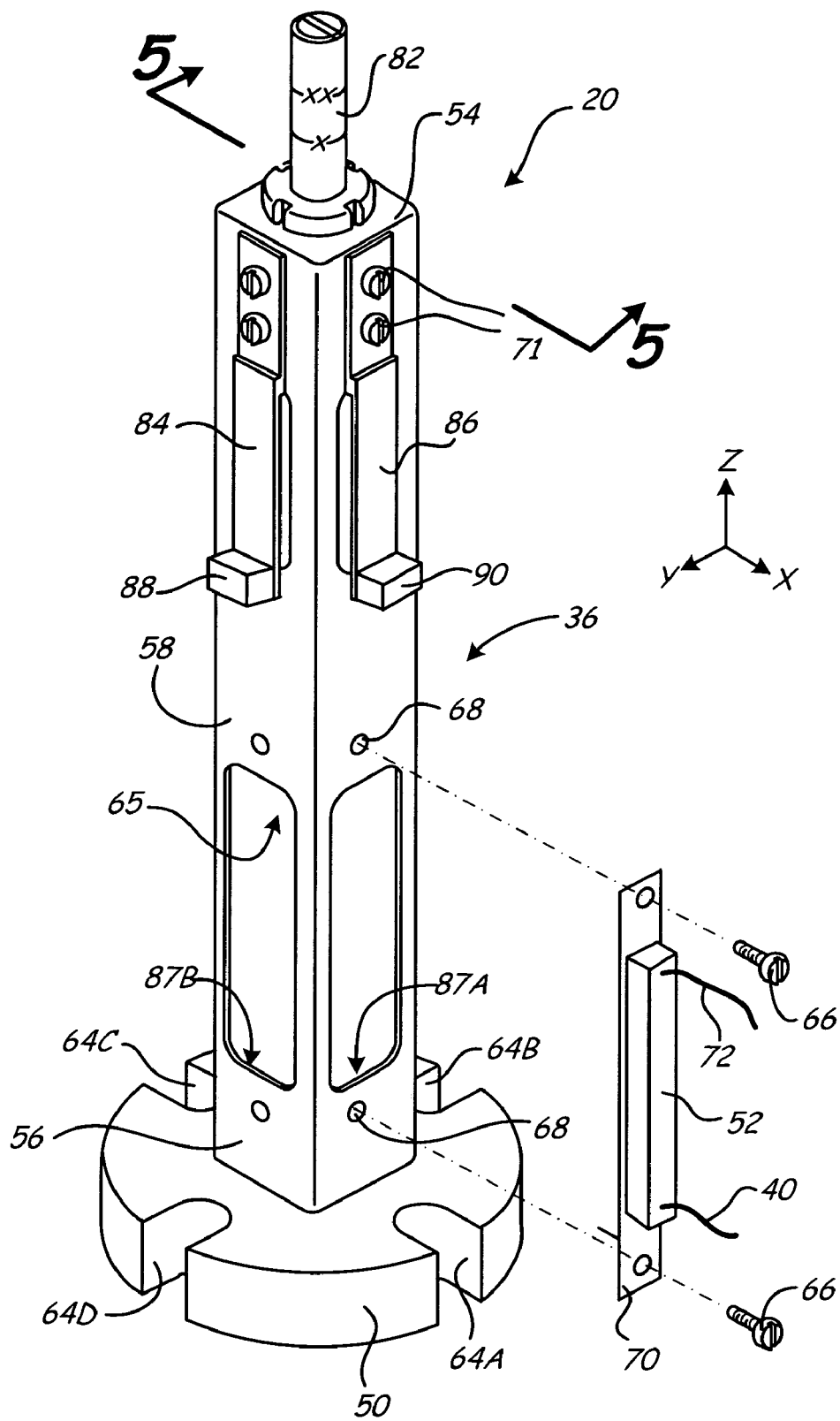
FIG. 4 shows a perspective view of a second embodiment of the adjustable frequency vibration power harvester of FIG. 1.
Figure 5:
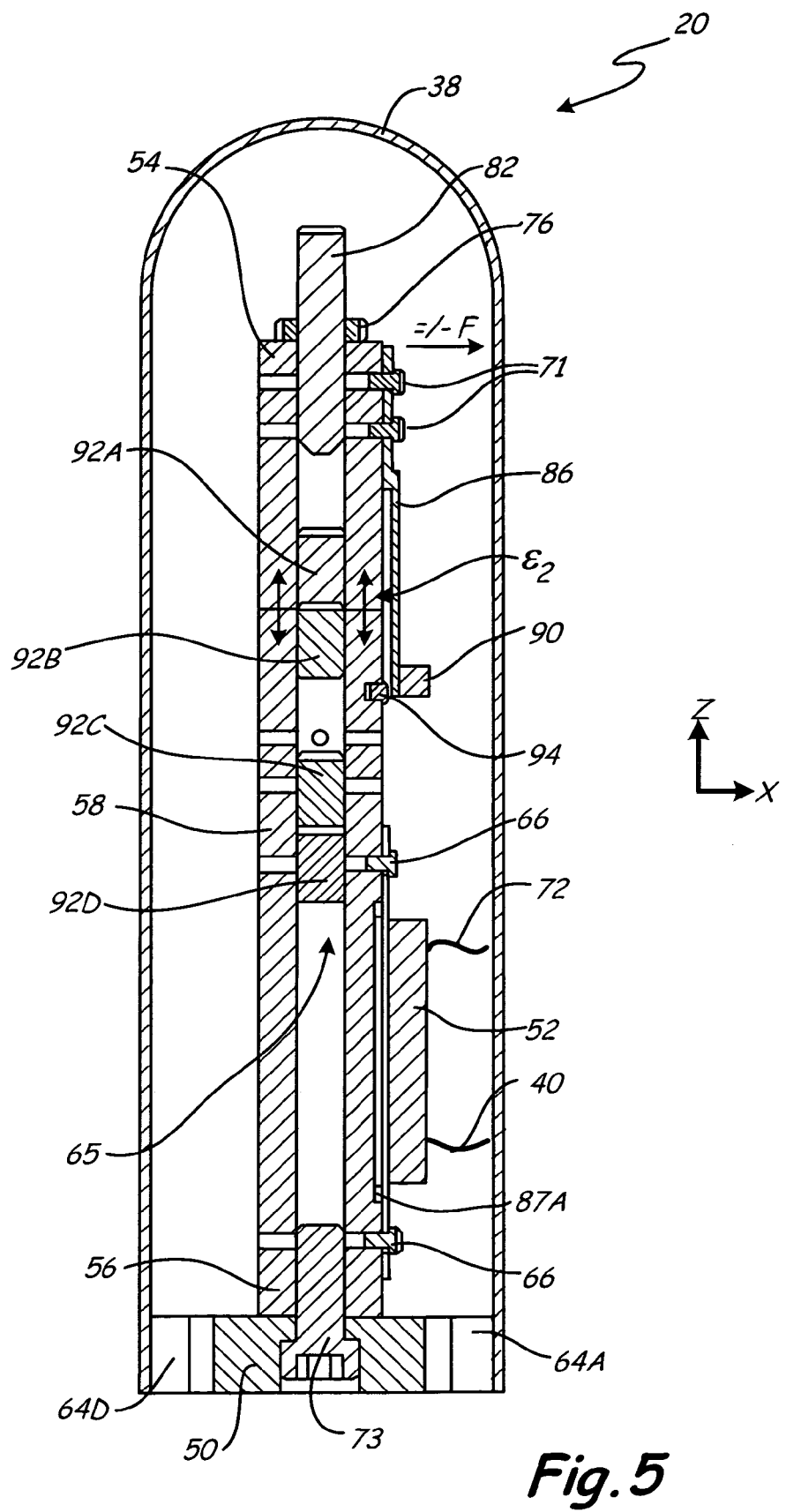
FIG. 5 shows a cross sectional view of the adjustable frequency vibration power harvester of FIG. 4.

FIG. 4 shows a perspective view of a second embodiment of adjustable resonance frequency vibration power harvester 20 of FIG. 1. In this embodiment, elongate body 36 of power harvester 20 includes elongate weight 82 and cantilevered harvesting devices 84 and 86. Elongate body 36, which is mounted to base 50, comprises similar components as shown in FIGS. 2 and 3, including first end 54, second end 56, midspan 58 and passageway 65. Elongate body 36 also includes openings 87A and 87B, which are similar to openings 60 and 62 of the embodiment of elongate body 36 shown in FIGS. 2 and 3. Openings 87A and 87B, however, do not extend through to interior passageway 65. Elongate body 36 is connected to base 50 with fastener 73, and base 50 is connected with a vibration source such as pipeline 18, as is done with base 50 of FIG. 2, to induce movement of first end 54 in the X, Y and Z directions. Circuitry 52 is mounted on printed circuit board 70 using bores 68 and threaded fasteners 66. Circuitry 52 is mounted to elongate body 36 such that circuitry 52 faces away from opening 87A.

Cantilevered harvesting devices 84 and 86 are connected to elongate body with threaded fasteners 71 such that the free ends of devices 84 and 86 are able to vibrate alongside elongate body 36. Cantilevered devices 84 and 86 also include weights 88 and 90, respectively, to increase the deflection of devices 84 and 86 as elongate body 36 vibrates. Similar to that of weight 75, the size and mass of weights 88 and 90 are selected such that devices 84 and 86 vibrate at resonance, thus maximizing the energy harvested for each, oscillation of elongate body 36.

Power harvester 20 also includes elongate weight 82 that is used to tune the vibration of elongate body 36. Elongate weight 82 increases the length of elongate body 36 to adjust the vibration characteristics of elongate body 36. Elongate weight 82 also displaces weight along the length of elongate body 36 to adjust the vibration characteristics of elongate body 36. Elongate weight 82 includes graduation marks indicating different distances along the length of elongate weight 82. The graduation marks can be used to indicate, for example, the distance elongate weight 82 extends beyond first side surface 84, the mass extending beyond first side surface 82, or the frequency of elongate body 36. Power harvester 20 also includes internal weight 92 traversable along passageway 65 to tune the frequency of elongate body 36, as is shown in FIG. 5.

FIG. 5 shows a cross sectional view of adjustable resonance frequency vibration power harvester 20 as taken at section 5-5 of FIG. 4. Power harvester 20 includes weights 92A, 92B, 92C and 92D, which provide localized tension of elongate body 36 to adjust the natural frequency of elongate body 36. Energy harvesting device 86 is secured to elongate body 36 with threaded fasteners 71 at only one end. As such, device 86 is suspended over elongate body 36 and is free to vibrate. Harvesting device 86 includes weight 90 that enhances the vibration of device 86 during operation, thus inducing greater deflection of device 86. Power harvester 20 is also provided with stopper 94, which is embedded within a notch in elongate body 36. Stopper 94, which in one embodiment comprises a rubber pad, dampens the vibration of harvesting device 86, thus preventing over-deflection and damage of harvesting device 86.

With circuitry 52 extending away from opening 87A, interior passageway 65 extends from first end 54 to second end 56. As such, internal frequency adjusting components, such as weights 82 and 92A-92D, are free to traverse the length of elongate body 36 without interference from circuitry 52. Elongate weight 82 extends into passageway 65 at first end 54, but also extends beyond first end 54. Elongate weight 82 includes threads to engage with threads in passageway 65 such that the position of elongate weight 82 along elongate body 36 can be adjusted. Elongate weight 82 has a mass that is extended out from first end 54 to extend the effective length of elongate body 36 and to change the mass distribution along elongate body 36. The length of elongate weight 82 is selected to permit a desired mass to extend beyond first end 54, but is selected based on design needs and the geometry of elongate body 36. The density of elongate weight 82 can be selected such that the weight of a unit length of elongate weight 82 matches the weight of a unit length of elongate body 36. The position of elongate weight 82 is secured within interior passageway 65 with lock nut 76. Similar to weights 74A and 74B, elongate body 36 also includes internal weights 92A-92D. Additionally, weights 92A-92D comprise two sets of tensioning weights to induce two separate strain variations in elongate body 36. In other embodiments, weights 92A-92D can be used independently within passageway 65 to increase deflection of elongate body in a manner similar to that of weight 82. In yet other embodiments of the present invention, the density of elongate body 36 can be varied from first end 54 to second end 56 to aid in adjusting the resonance vibration frequency of elongate body 36 to resonance.

The length of elongate body 36 is increased to increase the deflection at first end 54 during vibration [as is illustrated by variable l of equation (1), or variable $L_2$ of equation (4)], thus adjusting the natural frequency of elongate body 36 by method (c) described above. The position and mass of elongate weight 82 can be adjusted to increase or decrease the force F applied to first end 54 [as is illustrated by variable F of equation (2) and variable d in equation (1)], thus adjusting the natural frequency of elongate body 36 by methods (a) and (d) above. Internal weights 92A-92D, which are used to adjust the vibrational frequency of elongate body 36 in a similar fashion to that of weights 74A and 74B of FIGS. 2 and 3 by producing local strain $\epsilon_2$ in the walls of elongate body 36 [as is illustrated by elasticity E in equation (3)], thus adjusting the natural frequency of elongate body 36 by method (b) above.

Weights 46, 74A, 74B, 82 and 92A-92D comprise various features and means for adjusting the mechanical properties of elongate body 36 to induce resonance vibration of elongate body 36 when subjected to vibration from a vibration source. Typically, only one such feature would be necessary to induce resonance vibration in elongate body 36. However, each specific feature can be used alone or in conjunction with others. For example, one feature can be used enhance vibration in one direction, while another feature is used to dampen vibration in an opposite direction in order to further maximize deflection in the first direction. In other embodiments, the vibration adjusting features, such as weights 46, 74A, 74B, 82 and 92A-92D, can be modified as is needed for specific applications. For example, the specific sizes and materials of elongate body 36 and weights 46, 74A, 74B, 82 and 92A-92D can be selected based on design needs, as is dictated by the amount of power desired to be harvester and the frequency of the vibration source. Also, the number of vibration energy power harvesters can be adjusted. For example, in the embodiments shown in FIGS. 2-5, elongate beam 36 includes openings, such as openings 61 and 63, for four vibration energy power harvesters, one on each side of elongate beam 36. In other embodiments, however, the length of elongate beam 36 can be increased such as to include space for additional openings in elongate beam 36.

Once the design parameters for a specific system are selected, the resonance frequency for elongate body 36 can be determined, either mathematically or experimentally through trial and error. Accordingly, look-up tables correlating the frequency of the vibration source to the resonance frequency of elongate body 36 can be compiled and stored either in a reference manual or within transmitter electronics 24. Likewise, the graduation marks on elongate weight 82 can be inscribed with appropriate information for adjusting elongate body 36 to resonance. Although elongate body 36 is depicted as including multiple frequency adjusting devices, any one or combination of them may be used based on design needs. Thus, the power generated by vibration harvesting devices 42, 44, 84 and 86 can be maximized for a particular vibration of the vibration source.

Although the present invention has been described with reference to preferred embodiments, workers skilled in the art will recognize that changes may be made in form and detail without departing from the spirit and scope of the invention.

The invention claimed is:

1. A resonance frequency vibration power harvester comprising:
    a flexible elongate body having:
        a first end;
        a second end for connection to a vibration source such that the first end is cantilevered; and
        a threaded and cylindrical interior channel extending through at least a portion of the elongate body between the first end and the second end;
    a first vibration energy harvester device attached adjacent the first end of the elongate body to harvest energy as the flexible elongate body vibrates; and
    a cylindrical weight threaded into the interior channel at a fixed position to adjust a resonant frequency of the elongate body.

2. The resonance frequency vibration power harvester of claim 1 wherein the weight comprises an elongate threaded cylinder for traversing threaded engagements in the interior channel.

3. The resonance frequency vibration power harvester of claim 2 wherein the elongate threaded cylinder partially extends from the interior channel beyond the first end to increase overall effective length of the elongate body.

4. The resonance frequency vibration power harvester of claim 2 wherein the elongate threaded cylinder further includes graduated markings.

5. The resonance frequency vibration power harvester of claim 1 wherein the weight comprises a first threaded set screw for traversing threaded engagements in the interior channel.

6. The resonance frequency vibration power harvester of claim 5 wherein the threaded set screw is recessed within the interior channel to adjust midspan mass of the elongate body.

7. The resonance frequency vibration power harvester of claim 5 and further comprising a second threaded disk recessed within the interior channel, and wherein the first threaded disk and the second threaded disk are abutted against each other to adjust a local strain of the elongate body adjacent the first and second threaded disks.

8. The resonance frequency vibration power harvester of claim 7 and further comprising third and fourth threaded disks recessed within the interior channel, the third and fourth threaded disks abutting each other to adjust a local strain of the elongate body adjacent the third and fourth threaded disks such that the elongate body includes multiple induced strain variations.

9. The resonance frequency vibration power harvester of claim 1 and further comprising a second vibration energy harvester device attached adjacent the first end of the elongate body such that the first and second vibration energy harvester devices are offset ninety degrees from each other.

10. The resonance frequency vibration power harvester of claim 9 wherein the elongate body has a square cross section and the first and second vibration energy harvester devices are mounted to different faces of the elongate body.

11. The resonance frequency vibration power harvester of claim 10 wherein the first vibration energy harvester device is aligned along the elongate body for harvesting energy in a first direction and the second vibration energy harvester device is aligned along the elongate body for harvesting energy in a second direction such that the first vibration energy harvester device harvests energy in an x-direction and the second vibration energy harvester device harvests energy in a y-direction.

12. The resonance frequency vibration power harvester of claim 10 wherein the first vibration energy harvester device and the second vibration energy harvester device are aligned to harvest energy in one direction of vibration of the elongate body such that the first and second vibration energy harvester devices harvest energy in an x-direction.

13. The resonance frequency vibration power harvester of claim 1 and further comprising an opening in the elongate body adjacent the first vibration energy harvester device.

14. The resonance frequency vibration power harvester of claim 13 wherein the first vibration energy harvester device comprises:
- a first end fixedly attached to the elongate body adjacent the opening; and
- a second end unattached to the elongate body and suspended over the opening such that the first vibration energy harvester device is cantilevered over the opening and includes a weight positioned at a free end of the first vibration energy harvester device.

15. The resonance frequency vibration power harvester of claim 14 and further comprising mechanical stops to limit the movement of the cantilevered vibration energy harvester device.

16. The resonance frequency vibration power harvester of claim 1 wherein the density of the elongate body varies from the first end to the second end.

17. The resonance frequency vibration power harvester of claim 1 wherein the first vibration energy harvester device comprises an electromagnetic or a piezoelectric generator.

18. The resonance frequency vibration power harvester of claim 1 and further comprising an opening in the elongate body for receiving circuitry while allowing the weight to traverse the elongate body.

19. The resonance frequency vibration power harvester of claim 18 wherein:
the resonance frequency vibration power harvester further includes:
- harvester circuitry positioned within the opening; and
- a first cable for connecting the first vibration energy harvester device with the harvester circuitry; and the vibration source comprises an industrial process control system including a conduit and a process transmitter, wherein the process transmitter comprises:
- a sensor for sensing a parameter selected from the group consisting of pressure, temperature, level and flow of a process fluid in the conduit and for generating a sensor signal that is a function of the sensed parameter;
- transmitter electronics connected to the sensor, wherein the transmitter electronics condition the sensor signal to produce a transmitter output representative of the sensed parameter, the transmitter electronics capable of communicating over an external control loop; and
- a power cable connecting the harvester circuitry to the transmitter electronics such that the first vibration energy harvester device supplies power to the transmitter electronics and the sensor.

20. An adjustable frequency vibration power harvester comprising:
a base for connecting to a vibration source;
a beam comprising:
- a first end for connection with the base;
- a second end having an opening;
- an elongate hollow midspan portion extending between the base and the opening; and
- a threaded cylindrical channel extending into the elongate hollow midspan;
a first vibration energy harvester device attached nearer the first end than the second end; and
a first cylindrical mass having external threads that engage the mass with the threaded channel such that the mass is non-vibrating with respect to the beam, the mass being adjustably positioned in the elongate hollow midspan portion by rotation of the mass within the channel to adjust vibration properties of the beam.

21. The adjustable frequency vibration power harvester of claim 20 wherein the mass comprises an elongate threaded cylinder for traversing threaded engagements in the hollow midspan portion.

22. The adjustable frequency vibration power harvester of claim 21 wherein the elongate threaded cylinder partially extends from the hollow midspan portion beyond the second end to increase overall effective length of the beam.

23. The adjustable frequency vibration power harvester of claim 20 wherein the mass comprises a first threaded disk for traversing threaded engagements in the hollow midspan portion.

24. The adjustable frequency vibration power harvester of claim 23 wherein the threaded disk is recessed within the hollow midspan portion to adjust midspan mass of the beam.

25. The adjustable frequency vibration power harvester of claim 23 and further comprising a second threaded disk recessed within the hollow midspan portion, and wherein the first threaded disk and the second threaded disk are abutted against each other to adjust a local strain of the beam adjacent the first and second threaded disks.

26. The adjustable frequency vibration power harvester of claim 20 and further comprising a second vibration energy harvester device attached nearer the first end than the second end of the beam, and wherein the first vibration energy harvester device is aligned along the beam for harvesting energy in a first direction and the second vibration energy harvester device is aligned along the beam for harvesting energy in a second direction such that the first vibration energy harvester device harvests energy in an x-direction and the second vibration energy harvester device harvests energy in a y-direction.

27. The adjustable frequency vibration power harvester of claim 20 wherein the first vibration energy harvester device comprises:
- a first end fixedly attached to the beam adjacent the opening; and
- a second end unattached to the beam and suspended over the opening such that the first vibration energy harvester device is cantilevered over an opening along the hollow midspan portion and includes a weight positioned at a free end of the first vibration energy harvester device.

28. The adjustable frequency vibration power harvester of claim 20 wherein the density of the beam varies from the first end to the second end.

29. The adjustable frequency vibration power harvester of claim 20 wherein the first vibration energy harvester device comprises an electromagnetic or a piezoelectric generator.

* * * * *